April 9, 1946.  V. F. ZAHODIAKIN  2,398,270

SEGMENTAL PISTON RING

Filed Dec. 29, 1943

INVENTOR.
Victor F. Zahodiakin
BY
Wood, Arey, Herron & Evans
Attorneys.

Patented Apr. 9, 1946

2,398,270

UNITED STATES PATENT OFFICE 2,398,270

SEGMENTAL PISTON RING

Victor F. Zahodiakin, Short Hills, N. J.

Original application September 15, 1939, now Patent No. 2,355,772, August 15, 1944. Divided and this application December 29, 1943, Serial No. 516,061

5 Claims. (Cl. 309—44)

This invention relates to improvements in packing or compression rings of the type adapted to be used with pistons. The improved ring of this invention particularly lends itself to use as a compression ring for the pistons of internal combustion engines but is not limited to this use. It is capable of use, with the same advantages, as the packing ring for the pistons of pumps, steam engines, or any installation where packings of this general type are employed. This application is a division of my application Serial No. 295,106 filed September 15, 1939, now Patent Number 2,355,772, Aug. 15, 1944.

It has been one of the objects of the present invention to provide a piston ring adapted to the above uses which will readily and easily conform to any irregularity in the contour of a cylinder, and in this respect the invention has great utility when used in conjunction with worn cylinders. In other words, the object has been to provide a ring which will conform to localized irregularities or distortions as well as to general irregularities.

It has been a further object of the invention to provide a piston ring which can be made and assembled in a simple manner by a few operations. More specifically, the elements of the ring may be made by a punch press operation and the assembly may be accomplished by hand or automatic machinery as the case may be.

Specifically, the present invention contemplates the distribution around the circumference of the ring of the normal gap which must be provided in a piston ring to permit expansion and contraction and, toward this end, in the ring which constitutes the preferred embodiment of the invention this gap has been arranged in minute divisions around the entire circumference of the ring.

The concept of the invention has been to provide a ring made up of segments disposed in circumferential arrangement by means which provides, when installed, either radial pressure or circumferential pressure or both. In other words, the segments are connected so as to constitute a ring providing radial slits distributed around the ring. Thus the ring provides a series of independently flexible segments which may radially adjust themselves to local variations in the contour of the cylinder as well as to general irregularities or variations from a true circle.

The ring thus formed is extremely flexible and may be readily compressed for insertion into the cylinder. It will promptly adjust itself to the irregularities of the cylinder without mechanical fitting of the character required with most rings of the prior art.

Other objects and advantages of the invention will be more fully apparent from a description of the drawing in which.

Figure 1:
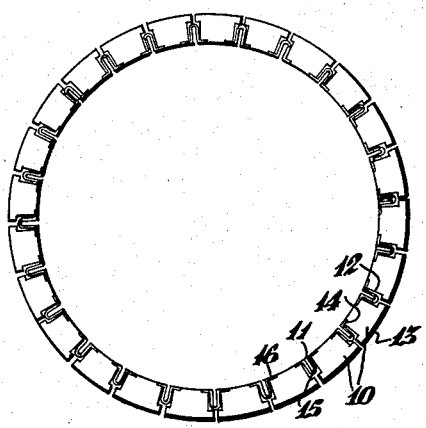
Figure 1 is a top plan view of the ring removed from the cylinder.
Figure 2:
Figure 2 is an enlarged fragmentary view of a section of the ring.
Figure 3:
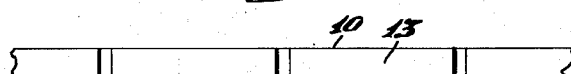
Figure 3 is a side view thereof.
Figure 4:
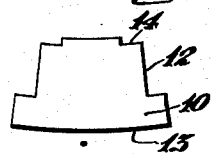
Figure 4 is a top plan view of one of the segments.
Figure 5:
Figure 5 is a side view thereof.
Figure 6:
Figure 6 is a top plan view of one of the spring means adjoining the segments.
Figure 7:
Figure 7 is a side view of Figure 6.

It is a general characteristic of the ring of the invention that a multiplicity of segments are joined together to form a complete piston ring.

Each pair of adjoining segments is joined together by a spring element which not only connects the segments but has the added function of urging the segments into contact with the cylinder wall.

In the drawing, the segments indicated at 10 are held in spaced relationship by individual spring clips 11. These clips 11 are disposed within the width and thickness of the assembled ring. For this purpose each segment has its end faces notched as at 12 back of the contact edge 13 providing clearance for the spring clip. Also, an additional notch 14 is provided on the inner periphery of the segment. The spring clip is of U-shape as indicated at 15. It includes attachment legs 16 extended circumferentially and spot welded in the respective notches 14. These spring clips are formed and mounted so as to exert a spring action circumferentially when the ring is mounted in the cylinder bore.

In the assembly of the completed ring the individual elements are stamped or otherwise fabricated, preferably from sheet metal, and thereafter assembled into a unitary structure to form the completed ring of the invention.

Having described my invention, I claim:

1. A piston ring comprising a series of segments forming an annular band, spring clips disposed within the confines of the band and connecting adjacent segments, said spring clips being of U-form with the sides of the U extended substantially radially and legs extending from the sides circumferentially and attached to the segments.

2. A piston ring comprising a series of separable segments arranged circumferentially to form an annular band, individual spring clips connecting each pair of adjacent segments, each of said clips being entirely disposed between the edges of a pair of adjoining segments and being secured thereto.

3. A piston ring comprising a series of separable segments arranged circumferentially, individual spring clips connecting each pair of adjacent segments, each of said clips being recessed in the bodies of the segments which it connects and being secured thereto.

4. A piston ring comprising a series of segments arranged circumferentially, spring clips disposed between and connecting adjacent segments, said clips being of U configuration in plan view with the arms of the U pointed inwardly of the ring, whereby the segments are urged outwardly by the action of the clips when the ring is installed in a cylinder.

5. A piston ring comprising an assembly of separable elements including a plurality of segments arranged to form an annular band and a plurality of spring clips, said elements being arranged circumferentially with segments and clips alternating, each clip being secured to the next adjacent segment and including a loop portion disposed within the confines of the band and adapted to generate both radial and circumferential pressure when the ring is installed in a cylinder.

VICTOR F. ZAHODIAKIN.